Sept. 1, 1925.
R. G. SANDS
1,551,700
ELECTRICAL PROTECTIVE APPARATUS
Filed April 9, 1923
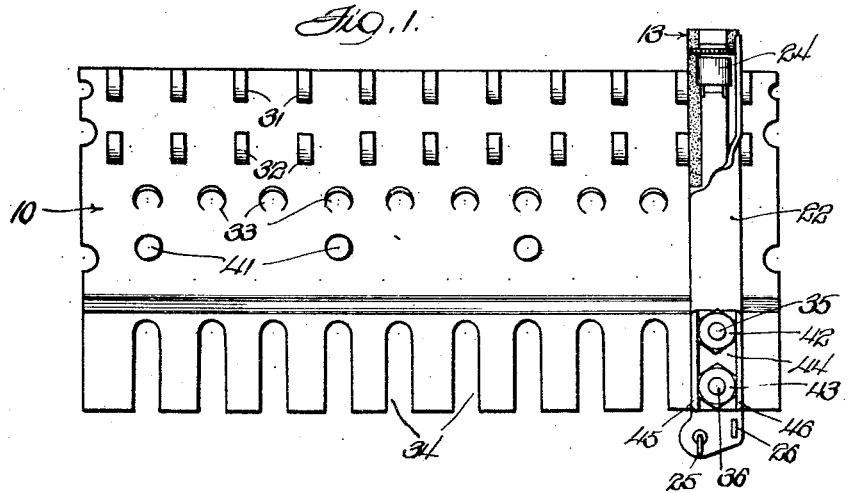
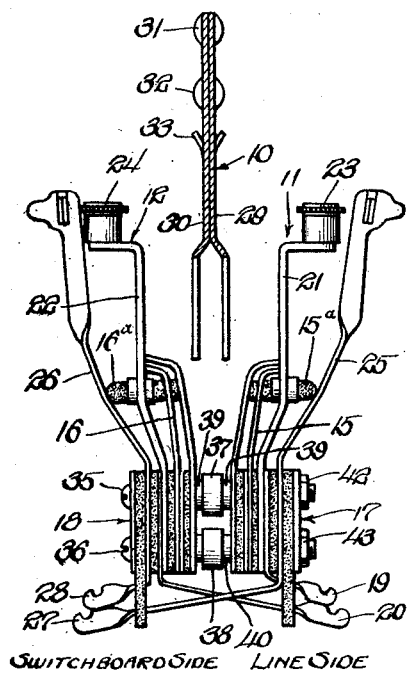
SWITCHBOARD SIDE    LINE SIDE
Witness:
P. L. Haselton
Inventor:
Roy G. Sands
By Jones, Addington, Ames, & Seibold
Attys.

Patented Sept. 1, 1925.

1,551,700

UNITED STATES PATENT OFFICE.

ROY G. SANDS, OF WAUKEGAN, ILLINOIS, ASSIGNOR TO COOK ELECTRIC COMPANY, OF CHICAGO, ILLINOIS, A CORPORATION OF ILLINOIS.

ELECTRICAL PROTECTIVE APPARATUS.

Application filed April 9, 1923. Serial No. 630,872.

*To all whom it may concern:*

Be it known that I, ROY G. SANDS, a citizen of the United States, residing at Waukegan, in the county of Lake and State of Illinois, have invented new and useful Improvements in Electrical Protective Apparatus, of which the following is a full, clear, concise, and exact description, reference being had to the accompanying drawing, forming a part of this specification.

The subject matter of this invention has reference to electrical protective apparatus comprising a combined lighting arrester and heat coil structure and more particularly to an improvement in a structure of this character adapted to be used for the protection of telephone and telegraph circuits.

It is desirable to protect telephone and telegraph circuits against both high potentials and abnormal currents and for this purpose the incoming lines at stations are each wired to a lightning arrester comprising a short spark gap with one electrode grounded for protection against excessive potentials and also to what is known as a heat coil for protection against excessive currents. Such lightning arresters and heat coils may conveniently be combined into units and the units are generally assembled in groups or strips on a mounting plate, which serves the double purpose of forming a mounting plate and a ground bar or connection.

One of the objects of this invention resides in the production of an improved combination lightning arrester and heat coil construction whereby a pair of lightning arresters and a pair of the heat coils may be assembled together as a unitary structure.

A further aim of this invention consists in the provision of a unitary structure of the character above indicated, which may be quickly and easily installed upon or removed from the mounting plate without disassembling the mounting plate itself or the assembled unitary structure and without disturbing any of the other protective devices carried by the mounting plate.

Another object consists in the provision of an improved design for a device of the character above indicated which will simplify and reduce the cost of the construction and which will materially reduce the work required to assemble and maintain the protective equipment of telephone exchanges and telegraph stations.

Other objects of the invention will become apparent from the following description and the appended claims.

One embodiment of the invention is illustrated in the accompanying drawings, in which—

Figure 1 is a side view of an arrester and heat coil mounting strip with a typical heat coil and lightning arrester unit mounted thereon;

Fig. 2 is a view in cross section of the mounting strip showing also a side view of an arrester and heat coil unit in position ready to be assembled in respect to the mounting strip; and, Fig. 3 is a view similar to Fig. 2 but showing the arrester and heat coil unit partly in elevation and partly in broken section in its assembled relation to the mounting strip.

The device as illustrated comprises in a general way a mounting plate or strip 10, also serving as a grounding plate, upon which the arrester and heat coil units may be removably mounted. A typical arrester and heat coil unit comprises a pair of heat coil structures, as at 11 and 12, a pair of gap lightning arresters as at 13 and 14, a pair of grounding switches as at 15 and 16 and the necessary insulated connections and terminal members as at 17 and 18. Arrester and heat coil units of this general character are hereinafter termed double spring assemblies.

The details of construction of many of the above elements are fully shown and described in the patent to R. G. Sands, 1,468,650, issued September 25, 1923, and such details therefore will not be herein described further than is necessary for the proper understanding of the present invention.

A pair of line wires may be connected to terminals 19 and 20 from which the circuit extends respectively through heat coil mounting springs 21 and 22, heat coils 23 and 24, heat coil operating springs 25 and 26, to switchboard terminals 27 and 28.

It will be understood that the heat coils 23 and 24 may be of any suitable known construction whereby the heat generated by excessive currents therethrough results in the release of the operating springs 25 and 26, permitting them to fly outwardly from their positions as shown in Fig. 3, to the positions as indicated in Fig. 2, thereby opening the circuit. The heat coil mounting springs 21 and 22 also serve to slidably retain the carbon electrode gap arresters 13 and 14 against the opposite sides of the mounting frame 10, as best indicated in Fig. 3.

The grounding switches 15 and 16 serve to short circuit the lightning arresters 13 and 14 and directly ground the heat coil structures 11 and 12, respectively, at such times as the heat coil operating springs 25 and 26 are in their open circuit positions. When the operating springs 25 and 26 are in the closed circuit positions indicated in Fig. 2, they serve to hold the switches 15 and 16 in their open circuit position through the medium of the insulated pins 15$^a$ and 16$^a$.

The mounting plate 10 may be formed in substantially the shape shown in any suitable manner, as by utilizing a pair of stamped metal plates 29 and 30, each provided with suitable struck-up portions as at 31, 32 and 33 for retaining the carbon electrodes of the lightning arresters in position. The mounting plate may be provided with a bifurcated lower edge formed by spreading apart the lower edges of the plates 29 and 30. Each of these separated or diverging edges may be formed with a number of open ended slots as at 34, equal to the number of protective units for which provision is to be made upon the mounting strip. The various insulated connections and terminals at 17 and 18 may be held together by a pair of screws or bolts 35 and 36 in the manner illustrated. Between the group of insulated connections on the line side of the mounting plate and the corresponding group of connections on the switchboard side, a pair of spacing washers 37 and 38 may be placed upon the screws 35 and 36, respectively. The width of the spacing washers should be substantially equal to the spacing of the spread lower edges of the plates 29 and 30. In order to prevent short circuiting or grounding of the various conducting terminals at 17 and 18 by the screws 35 and 36, the shanks of these screws may be surrounded by insulating sleeves 39 and 40.

The screws 35 and 36 provided with the washers as above described, together with the slots 34 form a very simple and easily constructed means for removably retaining the protective units upon the mounting strip 10. The various protective units may be slid on and off from the mounting strip without interfering with adjacent protective units and without disassembling the mounting strip in any way, whereas in the former devices of this character it has been the usual practice to attach the insulated connection members and terminals as at 17 and 18 as separate units to their corresponding mounting plates by separate pairs of screws with the heads of the screws positioned between the mounting plates. With this former type of construction, in order to provide additional protective units to a mounting strip or to remove certain units therefrom, it has been necessary to completely disassemble such units and in order to install or replace such individual mounting screws it has been necessary to separate the two mounting plates from one another. In a device embodying the present invention, however, the mounting plates 29 and 30 may be permanently assembled with respect to each other and retained in such assembled condition by spot welding as indicated at 41.

With the design embodying the present invention, a pair of protective devices, such for instance as may be connected to the two line wires of a single circuit, may be completely assembled before being placed upon the mounting strip and since it is unnecessary to disassemble these units in order to mount them, the assembling operations may be efficiently and accurately performed as a part of the process of the manufacture of the device.

When placing a protective unit upon the mounting strip, it is merely necessary to loosen the screws 35 and 36 slightly thus permitting the washers 37 and 38 and the insulation sleeves 39 and 40 to be slid into proper relation with the slots 34. The screws 35 and 36 may then be tightened thus firmly securing the unit in the desired position. The carbon electrodes of the lightning arresters 13 and 14 may be then slipped into place between the plates 29 and 30 and the springs 21 and 22 respectively. The screws 35 and 36 may be provided with nuts 42 and 43 bearing against a washer member 44 provided with flanges 45 and 46 for preventing turning movement of the nuts while the screws are being tightened, or as will readily be understood, bolts with flat sided heads may be used in connection with the flanged washer member thus rendering the bolts stationary while the nuts may be tightened.

This invention is obviously not limited to the specific embodiment thereof herein illustrated and described, but it is to be understood that the invention is capable of other variations and many modifications within its spirit and scope as set forth in the following claims.

Having thus described my invention, what I claim as new and desire to secure by Letters Patent in the United States, is:

1. Protective apparatus comprising a mounting plate member, a plurality of assemblies each including a plurality of lightning arrester and heat coil devices extending over both sides of said plate member, and means for retaining each of said assemblies upon said plate member, said means providing for complete and independent removal of each of said assemblies while still in assembled condition.

2. In a device of the character described a mounting plate member formed with slots extending inwardly from one edge thereof, bolts extending transversely of said plate member through said slots, and electrical protective assemblies in the form of individual units extending to either side of said plate member and each removably retained upon said plate by said bolts.

3. In a device of the character described a mounting plate member having a bifurcated edge and formed with slots extending inwardly from said edge, bolts extending transversely of said plate member through said slots, and electrical protective devices at either side of said plate member assembled as units upon said bolts.

4. Protective apparatus comprising a mounting plate member, and a combination lightning arrester and heat coil unit having a lightning arrester and a heat coil at either side of said plate member, said plate member being provided with a slot extending to the edge thereof, said unit being provided with a bolt extending transversely of said plate member and adapted to be slidably received by said slot to retain said unit upon said plate member.

5. Protective apparatus comprising a mounting plate member, and a plurality of combination lightning arrester and heat coil units each having a lightning arrester and a heat coil at either side of said plate member, said plate member being provided with a plurality of substantially parallel slots extending to the edge thereof, said units each being provided with a bolt extending transversely of said plate member and each adapted to be slidably received by one of said slots to retain said units upon said plate member.

6. In a device of the character described, a mounting means comprising a pair of superposed plates permanently fixed together, each of said plates being formed with a plurality of slots extending inwardly from an edge thereof, each of the slots on one plate being in substantial alignment with a corresponding slot on the other plate, and a plurality of protective units engaging said slots and the oppositely directed faces of said plates.

7. In a device of the character described, a mounting means consisting of two plates interconnected face to face and with the plates separated and diverging along one side, the diverging edges of said plates being provided with open ended slots, a double spring assembly extending over both sides of said mounting means, and a bolt forming a part of said double spring assembly and extending through said slots.

8. In a device of the character described, a mounting means consisting of two plates interconnected face to face and with the plates separated and diverging along one side, the diverging edges of said plates being provided with open ended slots, a double spring assembly extending over both sides of said mounting means, a bolt forming a part of said double spring assembly and extending through said slots, and a spacing washer upon said bolt between the diverging edges of the plates.

9. In a device of the character described, a mounting means consisting of two plates interconnected face to face and with the plates separated and diverging along one side, the diverging edges of said plates being provided with open ended slots, a double spring assembly extending over both sides of said mounting means, bolting means forming a part of said double spring assembly and extending through said slots, and means upon said spring assembly to prevent unintended turning of said bolting means while said means is being tightened for clamping said assembly in relation to the plates.

10. In a combination lightning arrester and heat coil device, a mounting structure comprising a plurality of opposed sheet metal plates severally provided with open ended slots, corresponding slots in said plates being opposite to each other, bolts projecting through pairs of corresponding slots and outwardly on opposite sides of said mounting structure, and assemblies of protective devices secured to said bolts.

11. The method of mounting spring assemblies for lightning arrester and heat coil units on ground plates which consists in permanently securing the plates together face-to-face with corresponding slots in alignment for the assembly securing bolts, mounting a double spring assembly upon a bolt, and thereafter sliding the bolt into aligned slots on the ground plate with a single spring assembly at each side of the plate.

In witness whereof, I have hereunto subscribed my name.

ROY G. SANDS.